(No Model.) 2 Sheets—Sheet 2.
J. HILLS.
POTATO DIGGER.
No. 539,515. Patented May 21, 1895.
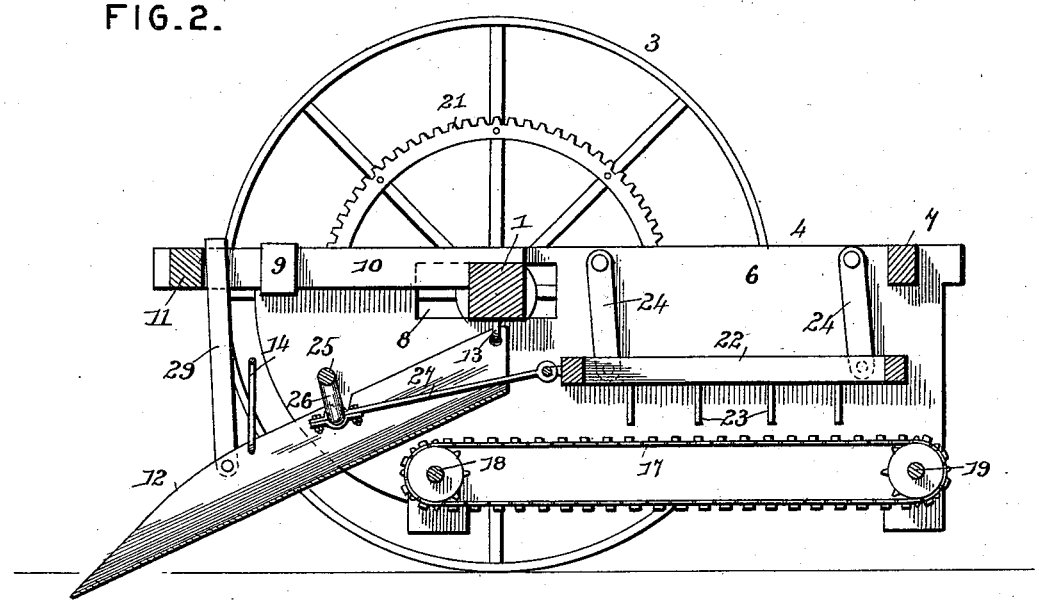
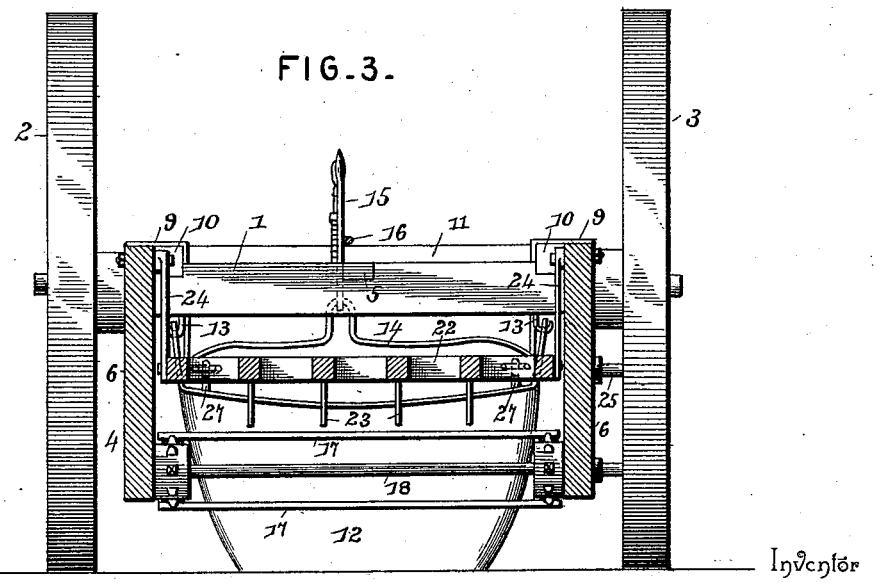
Witnesses
Jas. K. McCathran
J. F. F. Riley
Inventor
Justin Hills
By his Attorneys.
C A Snow & Co.

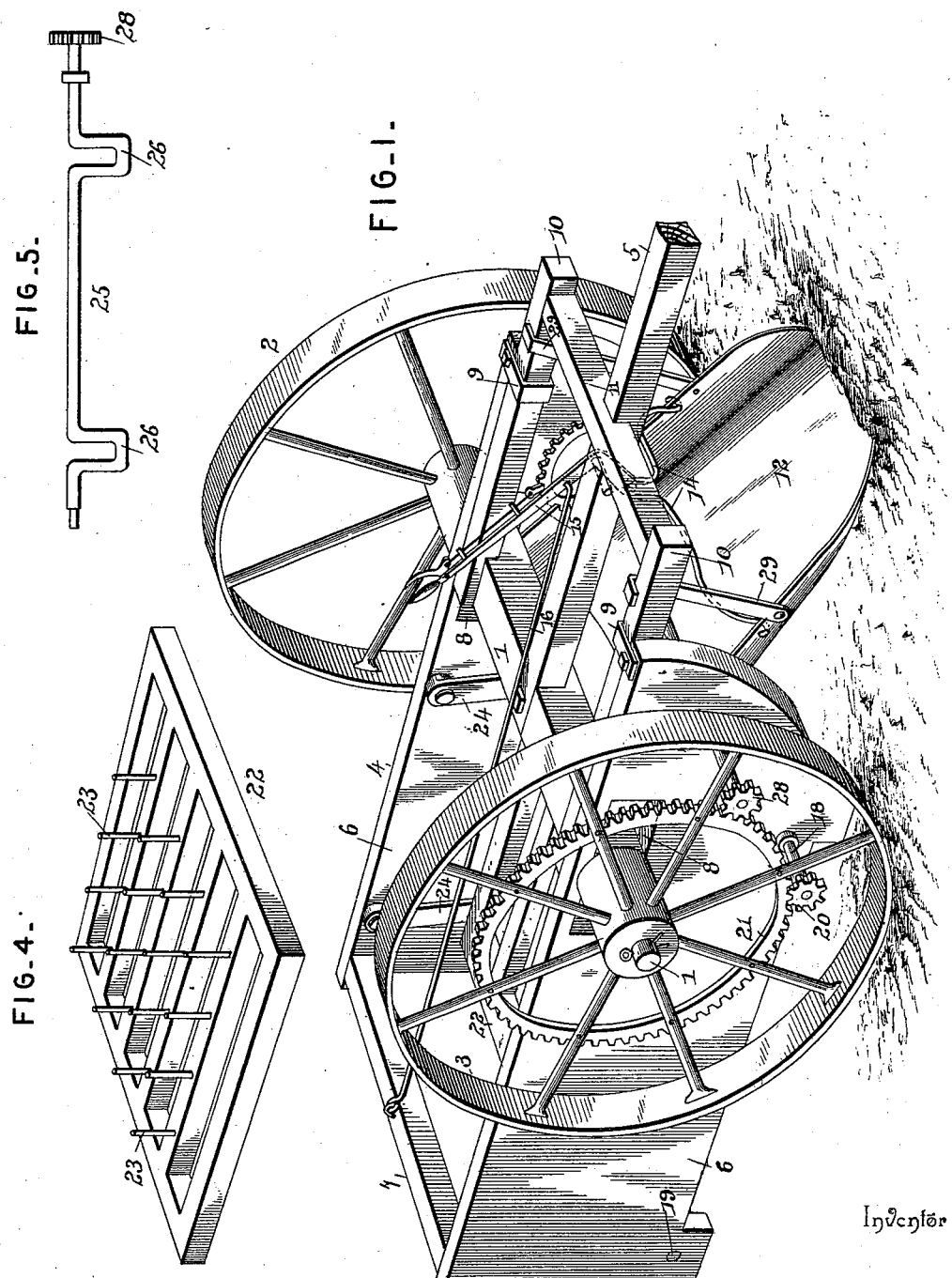

UNITED STATES PATENT OFFICE.

JUSTIN HILLS, OF WEST BAY CITY, MICHIGAN.

POTATO-DIGGER.

SPECIFICATION forming part of Letters Patent No. 539,515, dated May 21, 1895.

Application filed November 14, 1894. Serial No. 528,801. (No model.)

*To all whom it may concern:*

Be it known that I, JUSTIN HILLS, a citizen of the United States, residing at West Bay City, in the county of Bay and State of Michigan, have invented a new and useful Potato-Digger, of which the following is a specification.

The invention relates to improvements in potato diggers.

The object of the present invention is to improve the construction of potato diggers, and to provide an exceedingly simple and inexpensive one, capable of rapidly harvesting potatoes, extracting them from the ground, and delivering them at the rear of the machine in a clean, marketable condition.

The invention consists in the construction and novel combination and arrangement of parts hereinafter fully described, illustrated in the accompanying drawings, and pointed out in the claims hereto appended.

In the drawings, Figure 1 is a perspective view of a potato-digger constructed in accordance with this invention. Fig. 2 is a central longitudinal sectional view. Fig. 3 is a transverse sectional view. Fig. 4 is a detail perspective view of the shaking-pulverizer. Fig. 5 is a detail view of the crank-shaft.

Like numerals of reference indicate corresponding parts in all the figures of the drawings.

1 designates an axle having journaled on its spindles carrying wheels 2 and 3, and supporting a frame 4, to which is attached a draft pole 5. The supporting frame is composed of similar sides 6 connected at their rear ends by a cross-bar 7, and provided intermediate of their ends with openings 8, receiving the axle 1. The sides constitute a sliding section of the supporting frame, and their front ends are connected by guides or keepers 9 with longitudinally disposed side bars 10 of a rigid front section secured to the axle. This rigid front section of the supporting frame is composed of the said side bars 10, and a front transverse bar 11, which is secured to the front terminals of the bars 10 and to the draft pole, the latter being extended rearward and secured to the axle. By advancing the sliding portion or section of the supporting frame, or moving it rearward, the machine may be properly balanced.

An inclined shovel or scoop 12 is pivotally or hingedly connected at its upper end with the supporting frame by means of suitable hangers 13, depending from the axle 1, and its front portion is connected by a bail 14 with an operating lever 15, fulcrumed on the draft pole, and adapted to raise and lower the shovel. The operating lever is provided with a suitable ratchet and detent for holding the shovel at the desired adjustment. The operating lever is also connected by a rod 16 with the back of the frame, and is adapted to adjust the sliding portion thereof.

The potatoes, together with the clinging soil, are delivered by the shovel upon a horizontally disposed endless carrier, or conveyer 17, constructed of transverse bars or slats, and sprocket chains, and arranged upon sprocket wheels of front and rear shafts 18 and 19. The front shaft 18 carries a pinion 20, located on the exterior of the supporting frame, and meshing with a gear wheel 21, carried by the ground wheel 3, whereby the endless carrier or conveyer is operated. As the potatoes pass over or move rearward on the carrier or conveyer they are freed from the turning soil by a reciprocating or shaking pulverizer 22, consisting of a rectangular frame, and provided with depending teeth 23, adapted to remove the soil and pulverized clods, in order to deliver the potatoes in a marketable condition. The slats or transverse bars of the carrier are located a sufficient distance apart, to permit the soil removed from the potatoes, to fall to the ground. The frame of the reciprocating pulverizer is composed of longitudinal bars, and transverse end bars, and it is suspended from the sides 6 by hangers or links 24 pivoted at their upper ends to the supporting frame and similarly secured at their lower ends to the side edges of the reciprocating frame.

The endless conveyer extends forward a sufficient distance beyond the rear end of the shovel, to enable the shovel to be readily adjusted without interfering with the conveyer.

The pulverizer, which is located directly above the conveyer, or carrier, is actuated by a transverse crank shaft 25 journaled in suitable bearings at the front ends of the sides 6, and provided adjacent to each end with a crank bend 26; and these cranks are connected by pitman rods 27 with the pulverizer. The crank shaft extending through one side of the supporting frame and carries an exterior pinion 28, which meshes with the gear wheel 21 of the carrying wheel 3.

When the shovel is lowered in position for operation, it is supported by a pair of arms 29 extending upward from opposite sides of the shovel, and having their upper terminals bent outward laterally, and resting upon the side bars 10.

It will be seen that the potato digger is simple and comparatively inexpensive in construction, that it is capable of extracting potatoes rapidly from the ground, and of removing the soil from them, and that the potatoes are delivered in a marketable condition, at the rear of the machine.

Changes in the form, proportion, and the minor details of construction may be resorted to without departing from the principle or sacrificing any of the advantages of this invention.

What I claim is—

1. In a potato digger, the combination of a supporting frame, an adjustable shovel arranged at an inclination and adapted to be raised and lowered a conveyer located in rear of the shovel, and extending forward beneath the rear end of the same and a pulverizer mounted above the conveyer and arranged substantially parallel therewith and adapted to reciprocate, whereby the soil is removed from patatoes, substantially as described.

2. In a potato digger, the combination of a supporting frame, an adjustable shovel, arranged at an inclination and adapted to be raised and lowered a conveyer located in rear of the shovel and extending forward beneath the rear end of the same a pulverizer frame arranged over the conveyer and provided with depending teeth, and means for agitating the pulverizer frame, substantially as described.

3. The combination of a supporting frame, an inclined shovel, hinged at its upper rear end to the supporting frame, means for raising and lowering the shovel an endless conveyer arranged horizontally and located in the rear of the shovel, and extending forward beneath the rear end of the same a reciprocating pulverizer frame arranged over the conveyer and provided with depending teeth, links pivoted to the supporting frame and similarly connected with the pulverizer frame, and a crank shaft connected with the pulverizer frame and adapted to reciprocate the same, substantially as described.

4. In a potato digger, the combination of an axle, carrying wheels, a supporting frame comprising a rigid section having side bars and a sliding section provided with sides having openings to receive the axle and provided with guides receiving the said side bars, a shovel connected with the rigid section of the supporting frame, an endless conveyor mounted on the sliding section, the reciprocating pulverizer frame located above the conveyer, and gearing for operating the conveyer and the pulverizer frame, substantially as described.

In testimony that I claim the foregoing as my own I have hereto affixed my signature in the presence of two witnesses.

JUSTIN HILLS.

Witnesses:
WESLEY GLOVER,
JNO. C. HARRIS.